(12) United States Patent
Shirotori et al.

(10) Patent No.: US 9,196,271 B1
(45) Date of Patent: Nov. 24, 2015

(54) SPIN-TORQUE OSCILLATION ELEMENT AND MICROWAVE-ASSISTED MAGNETIC RECORDING HEAD USING THE SAME

(71) Applicant: KABUSHIKI KAISHA TOSHIBA, Minato-ku (JP)

(72) Inventors: Satoshi Shirotori, Yokohama (JP); Katsuhiko Koui, Yokohama (JP); Mariko Shimizu, Kawasaki (JP); Shuichi Murakami, Tokyo (JP); Norihito Fujita, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/613,738

(22) Filed: Feb. 4, 2015

(30) Foreign Application Priority Data

Oct. 21, 2014 (JP) .................................. 2014-214457
Nov. 14, 2014 (JP) .................................. 2014-231573

(51) Int. Cl.
*G11B 5/127* (2006.01)
*G11B 5/35* (2006.01)
*G11B 5/31* (2006.01)
*G11B 5/00* (2006.01)

(52) U.S. Cl.
CPC ............... *G11B 5/35* (2013.01); *G11B 5/3109* (2013.01); *G11B 2005/0024* (2013.01)

(58) Field of Classification Search
CPC .......... G11B 2005/0024; G11B 5/314; G11B 5/1278; G11B 2005/0002; G11B 5/35; G11B 5/23; G11B 5/3109
USPC ................... 360/119.03, 125.3, 128
See application file for complete search history.

(56) References Cited

U.S. PATENT DOCUMENTS

| | | | |
|---|---|---|---|
| 8,520,338 B2 | 8/2013 | Udo et al. | |
| 8,525,602 B2 * | 9/2013 | Katti | 331/94.1 |
| 8,724,262 B1 | 5/2014 | Koui | |
| 8,908,329 B2 * | 12/2014 | Shirotori et al. | 360/125.3 |
| 2002/0191354 A1 | 12/2002 | Yoshikawa et al. | |
| 2011/0090603 A1 | 4/2011 | Bai | |
| 2011/0216447 A1 * | 9/2011 | Li et al. | 360/313 |
| 2012/0147502 A1 * | 6/2012 | Udo et al. | 360/125.12 |
| 2012/0218667 A1 * | 8/2012 | Nagasawa et al. | 360/324.11 |
| 2013/0279046 A1 * | 10/2013 | Iwasaki et al. | 360/244 |

(Continued)

FOREIGN PATENT DOCUMENTS

| | | |
|---|---|---|
| JP | 3558996 B2 | 8/2004 |
| JP | 2011-090767 A | 5/2011 |
| JP | 2014-017030 A | 1/2014 |

OTHER PUBLICATIONS

Junyeon Kim, et al., "Layer thickness dependence of the current-induced effective field vector in Ta | CoFeB | MgO", Nature Materials, vol. 12, Mar. 2013, Online Publication Dec. 23, 2012, pp. 240-245.

*Primary Examiner* — Will J Klimowicz
(74) *Attorney, Agent, or Firm* — Oblon, McClelland, Maier & Neustadt, L.L.P.

(57) ABSTRACT

According to one embodiment, a spin-torque oscillation element includes a lamination structure containing a spin injection layer, a non-magnetic interlayer formed on the spin injection layer and an oscillation layer formed on the non-magnetic interlayer, and a non-magnetic conductive layer provided on a sidewall of the lamination structure, and the thickness of the lamination structure in a longitudinal direction is 60 nm or less.

10 Claims, 4 Drawing Sheets

(56) References Cited

U.S. PATENT DOCUMENTS

2013/0316088 A1\* 11/2013 Fujita et al. .................. 427/526
2014/0009853 A1   1/2014 Shirotori et al.
2014/0078620 A1\* 3/2014 Shirotori et al. ........... 360/234.3

\* cited by examiner

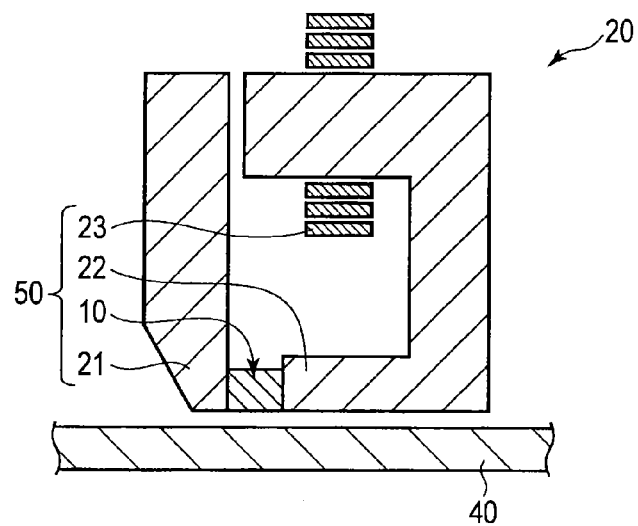
F I G. 4
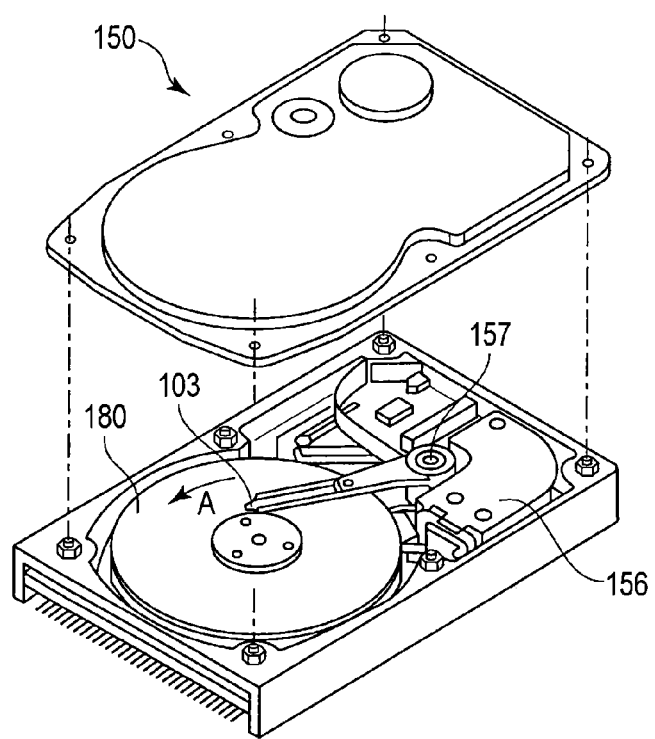
F I G. 5

SPIN-TORQUE OSCILLATION ELEMENT AND MICROWAVE-ASSISTED MAGNETIC RECORDING HEAD USING THE SAME

CROSS-REFERENCE TO RELATED APPLICATIONS

This application is based upon and claims the benefit of priority from Japanese Patent Applications No. 2014-214457, filed Oct. 21, 2014; and No. 2014-231573, filed Nov. 14, 2014, the entire contents of all of which are incorporated herein by reference.

FIELD

Embodiments described herein relate generally to a spin-torque oscillation element and a microwave-assisted magnetic recording head using the same.

BACKGROUND

In order to realize a microwave-assisted magnetic recording head, it is important to design and form a spin-torque oscillation element which can stably oscillate at low drive current. When the element size is, for example, about 70 nm, the maximum current density possible for the STO is $2 \times 10^8$ A/cm$^2$. For this current density or higher, for example, heat production and migration of the spin-torque oscillator occur, thereby degrading the characteristics of the element.

When manufacturing a microwave-assisted magnetic recording head, it is necessary to align a main pole and an STO at appropriate positions. Here, a method in which the STO and main pole are processed with the same mask such in order to align the STO and the main pole in a self-aligning manner, has the following drawback. That is, when the main pole is processed by ion-beam etching (IBE), the material of the main pole reattaches to a wall on the STO side, which interferes with high-frequency oscillation from the oscillation layer. On the other hand, if the STO is formed after the main pole is formed, the reattachment of the material of the main pole can be reduced because the main pole is not formed by IBE; however other problems may arise, such as difficulty in positioning in the self-aligning manner and degraded configuration due to a remaining base portion of the STO, which causes, for example, the suppression of high-frequency oscillation and electrical contact errors. Overmilling during processing of the STO may be considered to reduce the degradation of configuration shape; however overmilling causes, as a tradeoff, promotion of reattachment of the material of the main pole. It is another alternative to consider that the wall on the STO side be protected with an oxide or the like before processing the main pole in order to prevent the reattachment of the material of the main pole. However, this alternative is not yet sufficient to further reduce the drive current of the high-frequency oscillation.

BRIEF DESCRIPTION OF THE DRAWINGS

FIG. 4 is a schematic diagram showing a structure of a microwave-assisted magnetic recording head according to the second embodiment;

FIG. 5 is a perspective view showing a brief structure of a magnetic recording/reproduction device which can accommodate a microwave-assisted magnetic recording head according to the second embodiment;

DETAILED DESCRIPTION

Embodiments will now be described in detail.

A spin-torque oscillation element (STO) according to the first embodiment comprises a spin injection layer, a non-magnetic intermediate layer formed on the spin injection layer, a lamination structure comprising an oscillation layer and formed on the non-magnetic interlayer, and a non-magnetic conductive layer provided on a sidewall of the lamination structure. The width of the lamination structure in a longitudinal direction is 60 nm or less.

The second embodiment provides a microwave-assisted magnetic recording head to which a spin-torque oscillation element according to the first embodiment can be applied.

The magnetic recording head according to the second embodiment is a microwave-assisted magnetic recording head comprising a main pole configured to apply a magnetic field for recording, to a magnetic recording medium, an auxiliary magnetic pole configured to form a magnetic circuit together with the main pole, and a spin-torque oscillator provided between the main pole and the auxiliary magnetic pole. The spin-torque oscillator employed comprises a spin injection layer provided on the main pole or the auxiliary magnetic pole, a non-magnetic intermediate layer formed on the spin injection, a lamination structure comprising an oscillation layer and formed on the non-magnetic intermediate layer and a non-magnetic conductive layer provided on at least a part of the sidewall other than the air bearing surface of the lamination structure. The width of the air bearing surface of the lamination structure in a longitudinal direction is 60 nm or less.

In the microwave-assisted magnetic recording mode, a microwave-assisted magnetic recording head is used to apply a high-frequency magnetic field near the resonance frequency of the magnetic recording medium, which is sufficiently higher than the recording signal frequency, to the magnetic recording medium, locally. As a result, the magnetic recording medium resonates to reduce the coercive force (Hc) of the field-applied magnetic recording medium to a half or less of its original coercive force. Thus, with superposition of a high-frequency magnetic field to a magnetic field for recording, it becomes possible to achieve magnetic recording of a higher coercive force (Hc) and higher magnetic anisotropy energy (Ku) on a magnetic field for recording.

Figure 1:
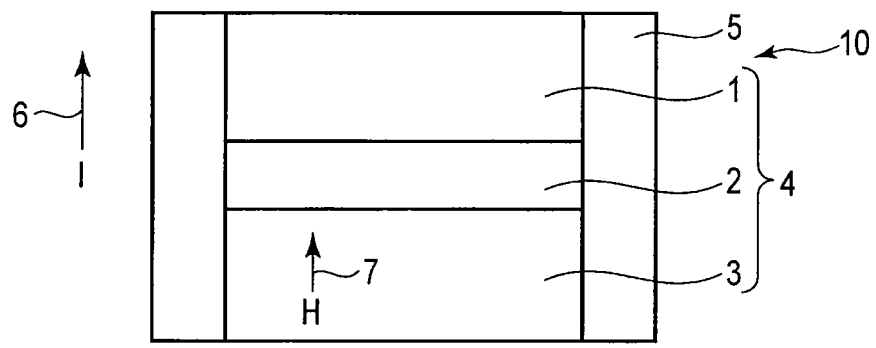
FIG. 1 is a schematic diagram showing a structure of a spin-torque oscillation element according to the first embodiment.

FIG. 1 is a schematic diagram showing a structure of the spin-torque oscillation element according to the first embodiment.

An STO 10 comprises a lamination structure 4 and a non-magnetic conductive layer 5 provided on a sidewall of the lamination structure 4. The lamination structure 4 comprises a field generating layer (FGL) 1, a spin injection layer (SIL) 3, an intermediate layer (IL) 2 formed between the field generating layer 1 and the intermediate layer, an underlying layer (not shown) provided undermost, and a cap layer (not shown) provided uppermost.

As the FGL, for example, an alloy material containing FeCo and at least one additional component selected from the group consisting of Al, Ge, Si, Ga, B, C, Se, Sn and Ni, or at least one artificial lattice material selected from the group consisting of Fe/Co, Fe/Ni and Co/Ni can be used.

Using these materials, it is possible to adjust, for example, Bs and Hk (anisotropic magnetic field) between the FGL and the spin injection layer, and the spin-torque transmission efficiency.

As the IL, for example, at least one non-magnetic metal selected from the group consisting of Cu, Al, Au, Ag, Pd, Os and Ir can be used. The thickness of the IL should preferably be 3 nm for each single elemental layer. With this structure, it is possible to adjust the exchange coupling between the FGL and SIL to an appropriate value.

As the SIL, at least one artificial lattice material selected from the group consisting of Fe/Co, Fe/Ni, Co/Ni, Co/Pt, Co/Pd, Fe/Pt and Fe/Pd, or an alloy such as CoPt or FePt can be used. Further, the SIL may further comprise, on an interface with the IL, a layer of an alloy material containing FeCo and at least one additional component selected from the group consisting of Al, Ge, Si, Ga, B, C, Se, Sn and Ni.

As the underlying layer and the cap layer, a non-magnetic conductive material such as Ti, Cu, Ru and Ta may be used.

Here, the STO 10 may comprise a pair of electrodes (not shown) conductive to both of lamination direction-wise ends of the lamination structure 4 comprising the FGL 1, the IL 2 and the SIL 3. With the electrodes, for example, a drive current (I) in the direction indicated by arrow 6 is allowed to pass to the lamination structure 4. Further, as an external magnetic field (H) directed in a direction perpendicular to the film surface, indicated by arrow 7 is applied to the STO, the FGL 1 rotates in procession movement around a rotation axis substantially perpendicular to the film surface to produce a high-frequency magnetic field to the outside.

The STO of the first embodiment is provided with the non-magnetic conductive layer 5 on the sidewall of the lamination structure 4. With this structure, electrons polarized in the non-magnetic conductive layer 5 are injected to the FGL 1 by the spin hall effect, thereby making it possible to reduce the drive current even further.

In usual cases, the spin polarization effect created by the non-magnetic conductive material used for the non-magnetic conductive layer 5 is so small that it can be neglected as compared to the spin polarization effect from the SIL 3. However, note here that when the FGL 1 has a thickness of 15 nm and the STO has an element size of 60 nm (in diameter φ), a total of the area of the interface between the FGL 1 and the IL 2 and the area of the interface between the SIL 3 and the IL 2 is equal to the area of the sidewall of the FGL 1. If the size is smaller than that specified above, the total area of the two interfaces is larger than the area of the sidewall and therefore the spin polarization effect from the non-magnetic conductive material exhibits some effect because of its area even if the spin polarizability is small.

Note that the term "element size of the STO" used here is meant the width of the lamination structure in its film surface direction. Therefore, when the STO is columnar, the size refers to its diameter, or when it is rectangular, the size refers to the length of one side. Naturally, the shape of the STO is not particularly limited. The element size of the STO is equivalent to the width of the lamination structure as viewed from the air bearing surface (ABS) when the magnetic head is assembled.

However, when a magnetic layer, in place of the non-magnetic conductive layer, is on the sidewall of the STO, the procession of the FGL and the magnetic layer of the sidewall resonate to attenuate the oscillation, and therefore a larger drive current is required. On the other hand, when an oxide film or an oxide film, in place of the non-magnetic conductive layer, is on the sidewall, the drive current does not flow to the sidewall, thereby reducing the drive current by the mirror reflection effect.

For further reduction of the drive current in the STO of this embodiment, it is expected that the injection of electrons from the sidewall by the spin hall effect may be carried out.

Note that examples of the non-magnetic conductive material used for the non-magnetic conductor layer are B, Al, Si, Ge, W, Nb, Mo, P, V, Sb, Zr, Hf, Y, Ti, Ta, Zn, Pb, Zr, Cr, Sn, Ga, Cu and rare earth elements. Further, two or more types of non-magnetic conductive materials can be used.

Incidentally, if the resistance of the non-magnetic conductive material is excessively small as compared those of the FGL and SIL, the drive current concentrates on the sidewall, which may cause the reduction of the oscillation efficiency or electro-migration. Further, it is known that the spin hall effect is caused by spin-orbit interaction, and the effect becomes larger as the material contains heavier element. Therefore, as the non-magnetic conductive material used for the sidewall, it is preferable that a material containing at least one element having a high molecular weight and also a resistance greater than or equal to those of the FGL and SIL, that is, for example, Ta, Hf and W, be employed. It is also preferable that an oxide or nitride film of the non-magnetic conductive material be provided on an outer side thereof. The oxide or nitride film of the non-magnetic conductive material exhibits the mirror reflection effect, by which the spin polarization in the non-magnetic conductive material can be obtained with high efficiency.

Figure 2:
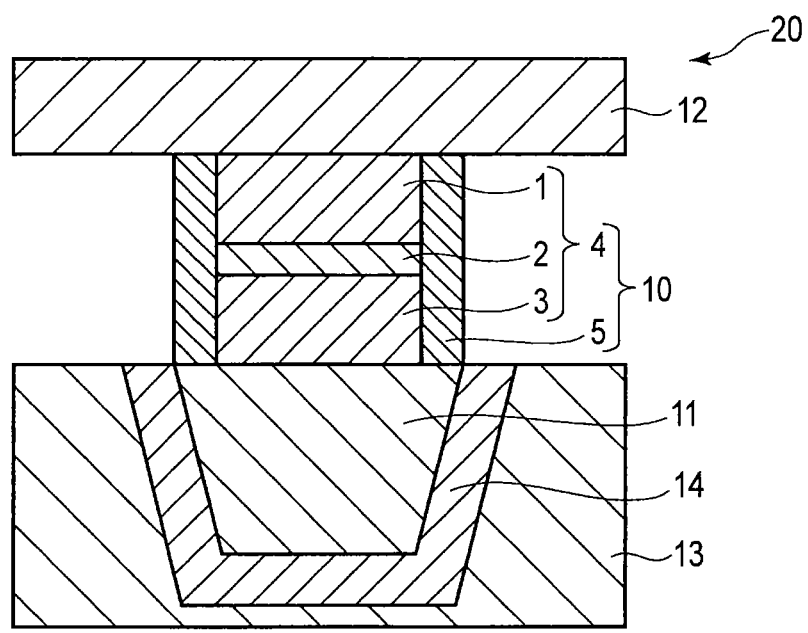
FIG. 2 is a schematic diagram showing a structure of a microwave-assisted magnetic recording head according to the second embodiment.

FIG. 2 is a schematic diagram showing a structure of a microwave-assisted magnetic recording head according to the second embodiment. This figure shows the recording head as viewed from the ABS side.

In a microwave-assisted magnetic recording head 20 of this embodiment, the lamination structure 4 in which the SIL 3, the IL 2 and the FGL 1 are formed in this order on the main pole (MP) 11 is provided. The lamination structure 4 and a non-magnetic conductive layer 5 formed on its sidewall constitute the STO 10. With the above-described structure of the STO 10, the microwave-assisted magnetic recording head 20 can reduce the voltage at the start of oscillation. Further, when the STO 10 is employed in the magnetic recording head, the decrease in oscillation efficiency due to reattachment of the MP material can be suppressed as another advantageous effect.

The MP is etched with the same mask as for the STO by ion beam etching (IBE) to the substrate, and thus the alignment between the STO and MP is possible. However, the MP material, which is a high-Bs material, reattaches to the sidewall of the STO, thereby suppressing oscillation from the oscillation layer. In this embodiment, the non-magnetic conductive layer is formed on the sidewall of the STO, and with this structure, the sidewall of the STO can be protected from the MP material directly attaching the sidewall Thus, stable oscillation of the STO can be achieved.

It is alternatively possible that the lamination structure 4 on the MP 11 comprises the FGL 1, the IL 2 and the SIL 3 formed in this order.

An auxiliary magnetic pole 12 configured to form a magnetic circuit is provided at a possible opposing the MP 11 via the STO 10. Optionally, a non-magnetic conductive layer 14 of, for example, Ru can be provided in the MP 11. Further, optionally, a side shield 13, which is a high-magnetic-permeability material such as FeNi or FeCoNi, can be provided on the non-magnetic conductive layer 14.

An example of the method of manufacturing a microwave-assisted magnetic recording head, according to the second embodiment, is illustrated in FIGS. 3A to 3F. These figures show the recording head as viewed from the ABS side.

As shown, an MP 11' of, for example, CoFe is formed on a substrate 15.

On top of that, a SIL, an IL and an FGL are formed, for example, in this order to form an STO material layer 10'.

Figure 3:
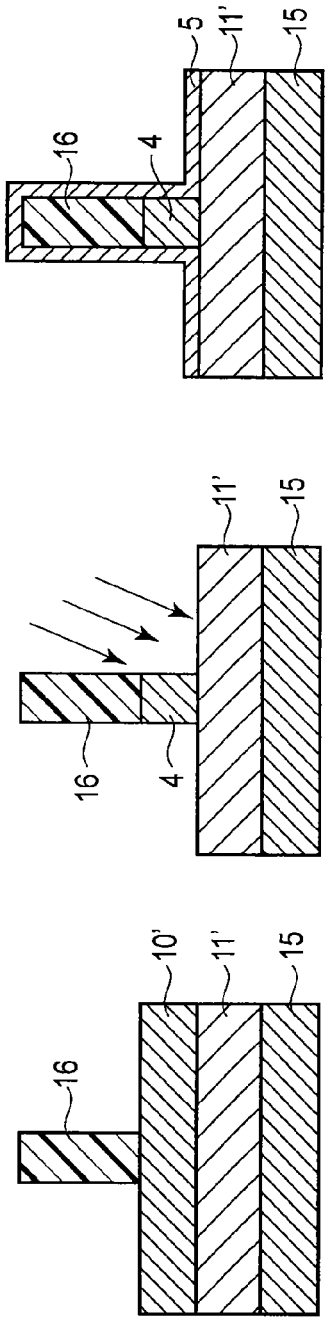
FIGS. 3A, 3B, 3C, 3D, 3E and 3F each are a diagram showing a structure of a microwave-assisted magnetic recording head according to the second embodiment.

After the formation of the STO material layer 10', a mask 16 for making an STO lamination structure and shaping the MP is formed as shown in FIG. 3A. For the mask 16, for example, a photoresist is used, but a hard mask of C, Si, Al or an oxide or nitride thereof may be used.

Next, as shown in FIG. 3B, the unmasked portion of the STO material layer 10' is removed with the IBE technique, thus forming an STO lamination structure 4. When the beam angle is inclined between a direction perpendicular to the surface of the STO material layer 10', that is, 0 degree, and 70 degrees with respect to the surface of the STO material layer 10' being set as 90 degrees, the STO lamination structure 4 having no bevel angle can be cut out. In general, there is such a tendency that as the beam angle is inclined towards a direction of 0 degree, the amount of reattachment of the MP material onto the STO lamination structure 4 is increased. On the other hand, there is such a tendency that as the beam angle is inclined towards a direction of 70 degree, the side etching progresses. Under these circumstances, it is preferable that the etching be carried out at a beam angle of 50 degrees.

Next, as shown in FIG. 3C, the non-magnetic conductive layer 5 is formed on the sidewall of the STO lamination structure 4 and the surface of the mask 16.

First, using, for example, Ta, W, Hf or the like, as the material, a non-magnetic conductive layer is formed on the surface of the STO lamination structure 4. Finally, the ABS is subjected to lapping process by polishing, and thus the non-magnetic conductive layer 5 is formed on a portion of the surface except for that equivalent to the ABS. For example, the MP material, which has a high Bs (saturation magnetic flux density) and contains FeCo as a main component, reattaches on the sidewall of the STO, the oscillation of the STO is significantly suppressed. But, as the reattachment material containing FeCo as a main component is completely removed by IBE, damage on the STO and the degradation of the shape of the STO become prominent. By contrast, according to this embodiment, the non-magnetic conductive layer also exhibits, in addition to the spin-hall effect described above, the effect of protecting the sidewall of the STO from the reattachment of the MP material during the formation of the MP.

Next, as shown in FIG. 3D, the MP layer 11' is processed by IBE, thereby forming an MP 11. The MP 11 corresponds to the skew angle of the magnetic recording head, and therefore it is processed into a shape having a bevel angle. The beam angle is set between 70 and 90 degrees after removing the portion of the MP 11 other than the mask portion down to the substrate at an angle of 0 to 70 degrees with respect to the surface of the STO lamination structure being at 90 degrees. In this manner, such a bevel angle as to form an inverted trapezoidal shape at the ABS surface can be adjusted.

Subsequently, as shown in FIG. 3E, a filling material 17 is formed to surround the STO and MP, and the mask 16, the non-magnetic conductive layer 5 formed thereon, and the side shield 17 are removed by the lift-off method, for planarization. The filling material 17 to surround the STO may be an insulating oxide such as $SiO_2$ or $Al_2O_3$. Or as the filling material 17, a shield material such as FeNi or FeCoNi may be used with a non-magnetic conductive material such as Ru. The planarization process may be chemical mechanical polishing (CMP), but naturally it may be done by ion beam etching.

After that, as shown in FIG. 3F, a write shield 18 of, for example, FeCoNi is formed on the STO 10 and the side shield 17.

Further, a power source 19 is provided between the write shield 18 and the MP 11 to connect them together, and thus a microwave-assisted magnetic recording head 20' is obtained.

Note that the microwave-assisted magnetic recording head 20' shown in FIG. 3F is similar to the microwave-assisted magnetic recording head 20 of FIG. 2 except that in the head 20', the MP 11 comprising the side shield 17 was formed to surround the STO via the non-magnetic conductive layer 5, followed by planarization, and them the STO was formed.

The above-described method of manufacturing a microwave-assisted magnetic recording head is only an example, and the embodiment is not particularly limited to this method as long as a non-magnetic conductive layer is formed on a sidewall of the STO.

FIG. 4 is a schematic diagram showing a structure of a microwave-assisted magnetic recording head according to the second embodiment.

As shown in FIG. 4, a magnetic head 20 of this embodiment comprises a reproduction head (not shown) and a write head 50. The reproduction head comprises a magnetic reproduction element (not shown) and a shield (not shown). The write head 50 comprises an MP 21 as a magnetic pole for recording, a trailing shield (auxiliary magnetic pole) 22 configured for reflux of a magnetic field from the MP 21, an STO provided between the MP 21 and the trailing shield (auxiliary magnetic pole) 22, and an excitation coil 23.

In a write or a read, the magnetic head 20 can be placed to oppose a magnetic recording medium 40 as shown in the figure.

In the write head 50 of the magnetic head 20, due to a gap magnetic field between the MP 21 and the trailing shield 22, an external magnetic field perpendicular to the film surface is applied. Thus, the oscillation layer rotates in procession movement around a rotation axis substantially perpendicular to the film surface to produce a high-frequency magnetic field to the outside. When the high-frequency magnetic field produced by the STO 10 is superposed on the magnetic field applied from the MP 21, it is possible to write on a magnetic recording medium 40 compatible for a higher recording density.

In this figure, the ABS of the STO 10 refers to a surface opposing the magnetic recording medium 40.

In this embodiment, a spin-torque oscillator having a low critical current density can be used as a source for producing a high-frequency magnetic field. In this manner, it is possible to reverse the magnetization of a magnetic recording medium with a large high-frequency magnetic field.

FIG. 5 is a perspective view showing a brief structure of a magnetic recording/reproduction device which can accommodate a magnetic head according to this embodiment.

That is, a magnetic recording/reproduction device 150 is a device of a model which employs a rotary actuator. In this figure, a recording-media disk 180 is set on a spindle, and rotated in a direction indicated by arrow A by a motor (not shown) driven in reply to a control signal from a controller of a drive device (not shown). The magnetic recording/reproduction device 150 may comprise a plurality of disk media 180.

A head slider 103 configured to record/reproduce data on/from a disk medium 180 has such a structure described above in connection with the structure shown in FIG. 4, and the slider 103 is mounted on the distal end of a thin-film suspension 154. Here, the head slider 103 comprises a distal end, for example, in the vicinity of which the magnetic head of this embodiment is mounted.

When the disk medium 180 is rotated, the ABS of the head slider 103 is held with a predetermined flying mount from the surface of the disk medium 180. Note that the slider may alternatively be the so-called "contact-running type" in which the slider contacts the disk medium 180.

The suspension 154 is connected to an end of an actuator arm 155 comprising a bobbin to hold a driving coil (not shown). The other end of the actuator arm 155 is provided with a voice coil motor 156. The voice coil motor 156 comprises a driving coil (not shown) rolled up on the bobbin of the actuator arm 155, and a magnetic circuit comprising a permanent magnet and a counter yoke disposed to opposite each other to interpose the coil therebetween.

The actuator arm 155 is held with ball bearings (not shown) provided at two locations in upper and lower sections of the spindle so as to be rotably slidable by means of the voice coil motor 156.

Figure 6:
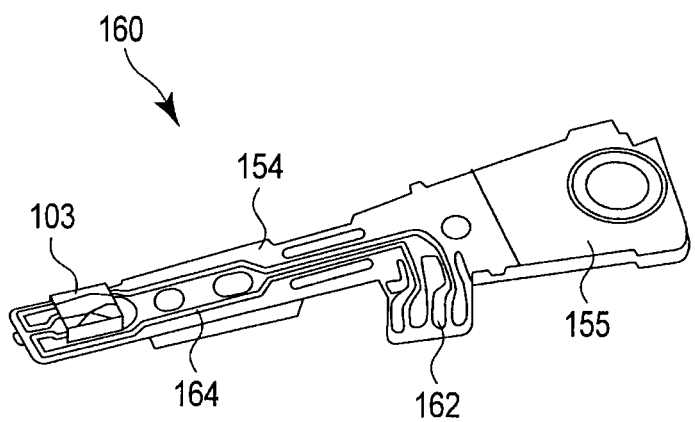
FIG. 6 is a schematic diagram showing an example of a magnetic recording head assembly according to the embodiment.

FIG. 6 is a schematic diagram showing an example of the magnetic head assembly according to this embodiment.

FIG. 6 is an enlarged perspective view of the magnetic head assembly from the actuator arm 155 to its distal end as viewed from the disk side. As shown, a magnetic head assembly 160 comprises the actuator arm 155 further comprising the bobbin to hold the driving coil, for example, and the suspension 154 is connected to one end of the actuator arm 155.

At the distal end of the suspension 154, the head slider 103 comprising the magnetic head 20 shown in FIG. 4 is mounted. The suspension 154 comprises lead lines 164 for write and read signals, which are electrically connected to respective electrodes of the magnetic head built in the head slider 103. This figure also shows an electrode pad 162 in the magnetic head assembly 160.

Example 1

A microwave-assisted magnetic head was manufactured in a process similar to that shown in FIGS. 3A to 3F.

First, an AlTiC substrate comprising a reproduction head was prepared.

Next, a non-magnetic conductive layer (Ru) was formed to have a desired shape on the substrate and a CoFe layer was formed thereon as an MP by plating.

On the MP, Ta and Cu were stacked in this order each to have a thickness of 2 nm as an underlayer of an STO by high-vacuum magnetron sputtering. Subsequently, an artificial lattice magnetic layer of Co/Pt having a thickness of 10 nm as a spin injection layer, an IL of Cu having a thickness of 2 nm, a FeCo layer having a thickness of 15 nm as an oscillation layer, and an Ru layer having a thickness of 5 nm as a cap layer were stacked one on another in this order.

A mask layer used to shape the STO and the MP was formed in the following process. That is, a photoresist was formed to have a thickness of 400 nm on a lamination structure of the STO, and then the photoresist was etched into a columnar shape having a diameter of 20 to 200 nm in order to vary the element size of the STO from 20 to 200 nm.

Next, the STO lamination structure was formed by IBE. The IBE was carried out on the STO lamination structure using a secondary ion-microprobe mass spectrometer (SIMS) until the underlayer of the STO was exposed.

Thereafter, a non-magnetic conductive material of Ta was formed to have a thickness of 3 nm by sputtering, and a Ta layer was formed over an entire pattern including the mask layer and the sidewall of the STO. Further, IBE was carried out to form the MP.

Next, a side gap layer of $Al_2O_3$ and an underlayer of Ru for plating were formed by sputtering, and a side shield layer of NiFe was formed by plating. Then, the mask layer was removed by CMP, followed by planarization. Subsequently, an FeCoNi layer was formed as a write shield, thereby obtaining a magnetic head for recording.

Lastly, a lapping process was carried out by polishing to expose the ABS, and thus the STO was obtained.

Figure 7:
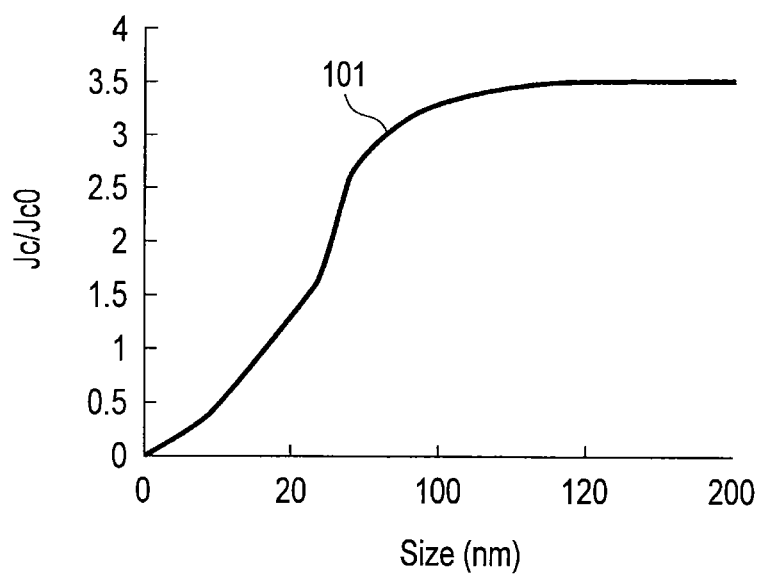
FIG. 7 is a graph showing the relationship between the current density at start of oscillation and the size of element.

Thus obtained magnetic recording heads of various sizes were measured in terms of current density at the start of oscillation. FIG. 7 is a graph showing the relationship between the starting voltage for oscillation and the element size.

The current density Jc at start of oscillation was measured while a recording current is applied to the STO with various drive current densities using a spin stand.

A curve 101 on the graph of FIG. 7 indicates the element-size dependency of the current density at the start of oscillation. Here, the current density at the start of oscillation for an STO element size of 40 nm was set to Jc0. It is understood from the curve 101 of the graph that when the size of the STO element is less than or equal to that which makes the area of the interfaces between the FGL, SIL and IL and the area of the sidewall of the FGL equal to each other, that is, 60 nm (in diameter φ) or less, the current density at the start of oscillation significantly decreases.

Further, the electrical resistivity of the non-magnetic conductive material employed and the ratio in the current density at the start of oscillation (Jc/Jc0) with respect to the magnetic recording head manufactured with the STO element having a size of 40 nm (in diameter φ) are indicated in TABLE 1 below.

Example 2

A microwave-assisted magnetic head was manufactured in a process similar to that of Example 1 except that the size of the STO element was 40 nm (in diameter φ), and in place of the Ta layer, an Hf layer was formed to have a thickness of 3 nm by sputtering as the non-magnetic conductive material.

The electrical resistivity of the non-magnetic conductive material employed and the ratio in the current density at the start of oscillation (Jc/Jc0) of the obtained magnetic recording head are indicated in TABLE 1 below.

Example 3

A microwave-assisted magnetic head was manufactured in a process similar to that of Example 1 except that the size of the STO element was 40 nm (in diameter φ), and in place of the Ta layer, a W layer was formed to have a thickness of 3 nm by sputtering as the non-magnetic conductive material.

The electrical resistivity of the non-magnetic conductive material employed and the ratio in the current density at the start of oscillation (Jc/Jc0) of the obtained magnetic recording head are indicated in TABLE 1 below.

Example 4

A microwave-assisted magnetic head was manufactured in a process similar to that of Example 1 except that the size of the STO element was 40 nm (in diameter φ), and in place of the Ta layer, a Cu layer was formed to have a thickness of 3 nm by sputtering as the non-magnetic conductive material.

The electrical resistivity of the non-magnetic conductive material employed and the ratio in the current density at the start of oscillation (Jc/Jc0) of the obtained magnetic recording head are indicated in TABLE 1 below.

Example 5

A microwave-assisted magnetic head was manufactured in a process similar to that of Example 1 except that the oscillation layer of the STO was replaced by an FeCoAl layer.

The electrical resistivity of the non-magnetic conductive material employed and the ratio in the current density at the start of oscillation (Jc/Jc0) of the obtained magnetic recording head are indicated in TABLE 1 below.

Example 6

A microwave-assisted magnetic head was manufactured in a process similar to that of Example 2 except that the oscillation layer of the STO was replaced by an FeCoAl layer.

The electrical resistivity of the non-magnetic conductive material employed and the ratio in the current density at the start of oscillation (Jc/Jc0) of the obtained magnetic recording head are indicated in TABLE 1 below.

Example 7

A microwave-assisted magnetic head was manufactured in a process similar to that of Example 3 except that the oscillation layer of the STO was replaced by an FeCoAl layer.

The electrical resistivity of the non-magnetic conductive material employed and the ratio in the current density at the start of oscillation (Jc/Jc0) of the obtained magnetic recording head are indicated in TABLE 1 below.

Example 8

A microwave-assisted magnetic head was manufactured in a process similar to that of Example 4 except that the oscillation layer of the STO was replaced by an FeCoAl layer.

The electric resistivity of the non-magnetic conductive material employed and the ratio in the current density at the start of oscillation (Jc/Jc0) of the obtained magnetic recording head are indicated in TABLE 1 below.

Comparative Example 1

A microwave-assisted magnetic head was manufactured in a process similar to that of Example 1 except that the size of the STO element was 40 nm (in diameter $\phi$), and in place of the Ta layer as the non-magnetic conductive material, a TaOx layer of an insulating material was formed to have a thickness of 3 nm by sputtering.

The ratio in the current density at the start of oscillation (Jc/Jc0) of the obtained magnetic recording head is indicated in TABLE 1 below.

Comparative Example 2

A microwave-assisted magnetic head was manufactured in a process similar to that of Example 1 except that the size of the STO element was 40 nm (in diameter $\phi$), and in place of the Ta layer as the non-magnetic conductive material, an HfOx layer of an insulating material was formed to have a thickness of 3 nm by sputtering.

The ratio in the current density at the start of oscillation (Jc/Jc0) of the obtained magnetic recording head is indicated in TABLE 1 below.

Comparative Example 3

A microwave-assisted magnetic head was manufactured in a process similar to that of Example 1 except that the size of the STO element was 40 nm (in diameter $\phi$), and in place of the Ta layer as the non-magnetic conductive material, a WOx layer of an insulating material was formed to have a thickness of 3 nm by sputtering.

The ratio in the current density at the start of oscillation (Jc/Jc0) of the obtained magnetic recording head is indicated in TABLE 1 below.

Comparative Example 4

A microwave-assisted magnetic head was manufactured in a process similar to that of Example 1 except that the size of the STO element was 40 nm (in diameter $\phi$), and a non-magnetic conductive material was not formed on the STO lamination structure and the mask layer, but the MP was formed by IBE.

The ratio in the current density at the start of oscillation (Jc/Jc0) of the obtained magnetic recording head is indicated in TABLE 1 below.

TABLE 1

| | Material of oscillation layer | Material of non-magnetic conductive layer | Jc/Jc0 | Electro-conductivity of non-magnetic conductive material ($\mu\Omega$cm) |
|---|---|---|---|---|
| Example 1 | FeCo | Ta | 1 | 26 |
| Example 2 | FeCo | Hf | 1.2 | 70 |
| Example 3 | FeCo | W | 1.2 | 12 |
| Example 4 | FeCo | Cu | 1.4 | 4 |
| Example 5 | FeCoAl | Ta | 0.9 | 26 |
| Example 6 | FeCoAl | Hf | 1.1 | 70 |
| Example 7 | FeCoAl | W | 1.1 | 12 |
| Example 8 | FeCoAl | Cu | 1.3 | 4 |

TABLE 2

| | Material of oscillation layer | Material of non-magnetic conductive layer | Jc/Jc0 |
|---|---|---|---|
| Comparative Example 1 | FeCo | TaOx | 1.5 |
| Comparative Example 2 | FeCo | HfOx | 1.7 |
| Comparative Example 3 | FeCo | WOx | 1.5 |
| Comparative Example 4 | FeCo | Absent | 2.4 |

From TABLES 1 and 2 above, it can be understood that when an oxide film is used for the material of the sidewall (that is, in Comparative Examples 1 to 3), the current density at the start of oscillation is decreased as compared to the case where the sidewall material is not used (that is, in Comparative Example 4). It is further understood that with use of the non-magnetic conductive material for the sidewall (that is, in Examples 1 to 8), the current density at the start of oscillation can be decreased to even a lower level.

Moreover, it has been confirmed that Cu, the same material used for the interlayer, is used for the non-magnetic conductive layer (that is, Examples 4 and 8), the current density at the start of oscillation can be decreased as compared to the Comparative Examples. This is considered to be because thickness of the sidewall is only about 3 nm, and as compared to the Cu layer used as the interlayer, Cu as the material for the sidewall due to its low crystalinity, functions to relax current concentration to the non-magnetic conductive material of the sidewall. On the other hand, as the non-magnetic conductive material, a high-resistivity and heavy element material (that is, Examples 1 to 3 and 5 to 7) exhibits a low current density at the start of oscillation and even a higher effect from the sidewall as compared to a low-resistivity and light element material (Examples 4 and 8) such as Cu. Further, similar effects ca be obtained in each of the oscillation materials of FeCo and FeCoAl.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spin-torque oscillation element comprising:
    a lamination structure comprising a spin injection layer, a non-magnetic interlayer formed on the spin injection layer, and an oscillation layer formed on the non-magnetic interlayer;
    a non-magnetic conductive layer comprising a non-magnetic conductive material provided on a sidewall of the lamination structure; and
    an oxide film or a nitride film of a non-magnetic conductive material provided on the non-magnetic conductive layer,
    wherein an electrical resistivity of the non-magnetic conductive material of the non-magnetic conductive layer is greater than or equal to those of the oscillation layer and the interlayer,
    wherein an electrical resistivity of the oxide film or the nitride film of the non-magnetic conductive material is greater than that of the non-magnetic conductive material of the non-magnetic conductive layer, and
    wherein a thickness of the lamination structure in a longitudinal direction is not more than 60 nm.

2. The spin-torque oscillation element of claim 1, wherein a non-magnetic conductive material for the non-magnetic conductive layer comprises a non-magnetic conductive material selected from the group consisting of tungsten, hafnium, and tantalum.

3. The spin-torque oscillation element of claim 1, which comprises the oxide film of a non-magnetic conductive material provided on the non-magnetic conductive layer.

4. The spin-torque oscillation element of claim 1, which comprises the nitride film of a non-magnetic conductive material provided on the non-magnetic conductive layer.

5. The spin-torque oscillation element of claim 1, wherein the non-magnetic conductive material comprises at least one member selected from the group consisting of B, Al, Si, Ge, W, Nb, Mo, P, V, Sb, Zr, Hf, Y, Ti, Ta, Zn, Pb, Zr, Cr, Sn, Ga, Cu and rare earth elements.

6. A microwave-assisted magnetic head comprising:
    a main pole configured to apply a magnetic field for recording to a magnetic recording medium;
    an auxiliary magnetic pole configured to form a magnetic circuit together with the main pole; and
    a spin-torque oscillator provided between the main pole and the auxiliary magnetic pole,
    the spin-torque oscillator further comprising: a lamination structure comprising a spin injection layer formed on one of the main pole and the auxiliary magnetic pole, a non-magnetic interlayer formed on the spin injection layer, and an oscillation layer formed on the non-magnetic interlayer;
    a non-magnetic conductive layer comprising a non-magnetic conductive material provided on at least a part of a sidewall of the lamination structure other than an air bearing surface of the lamination structure; and
    an oxide film or a nitride film of a non-magnetic conductive material provided on the non-magnetic conductive layer,
    wherein an electrical resistivity of the non-magnetic conductive material for the non-magnetic conductive layer is greater than or equal to those of the oscillation layer and the interlayer,
    wherein an electrical resistivity of the oxide film or the nitride film of the non-magnetic conductive material is greater than that of the non-magnetic conductive material of the non-magnetic conductive layer, and
    wherein a thickness of the lamination structure in a longitudinal direction of the air bearing surface is 60 nm or less.

7. The magnetic head of claim 6, wherein a non-magnetic conductive material for the non-magnetic conductive layer comprises a non-magnetic conductive material selected from the group consisting of tungsten, hafnium and tantalum.

8. The microwave-assisted magnetic head of claim 6, which comprises the oxide film of a non-magnetic conductive material provided on the non-magnetic conductive layer.

9. The microwave-assisted magnetic head of claim 6, which comprises the nitride film of a non-magnetic conductive material provided on the non-magnetic conductive layer.

10. The microwave-assisted magnetic head of claim 6, wherein the non-magnetic conductive material comprises at least one member selected from the group consisting of B, Al, Si, Ge, W, Nb, Mo, P, V, Sb, Zr, Hf, Y, Ti, Ta, Zn, Pb, Zr, Cr, Sn, Ga, Cu and rare earth elements.

* * * * *